US009389354B2

(12) United States Patent
Yu et al.

(10) Patent No.: US 9,389,354 B2
(45) Date of Patent: Jul. 12, 2016

(54) BACKLIGHT MODULE

(71) Applicant: Shenzhen China Star Optoelectronics Technology Co., Ltd., Shenzhen, Guangdong (CN)

(72) Inventors: Gang Yu, Guangdong (CN); Yuchun Hsiao, Guangdong (CN); Shihhsiang Chen, Guangdong (CN)

(73) Assignee: Shenzhen China Star Optoelectronics Technology Co., Ltd, Shenzhen (CN)

( * ) Notice: Subject to any disclaimer, the term of this patent is extended or adjusted under 35 U.S.C. 154(b) by 222 days.

(21) Appl. No.: 14/235,751

(22) PCT Filed: Jan. 3, 2014

(86) PCT No.: PCT/CN2014/070119
§ 371 (c)(1),
(2) Date: Jan. 28, 2014

(87) PCT Pub. No.: WO2015/089916
PCT Pub. Date: Jun. 25, 2015

(65) Prior Publication Data
US 2015/0168629 A1    Jun. 18, 2015

(30) Foreign Application Priority Data

Dec. 16, 2013  (CN) .......................... 2013 1 0692716

(51) Int. Cl.
*F21V 7/04*  (2006.01)
*F21V 8/00*  (2006.01)

(52) U.S. Cl.
CPC ............ *G02B 6/0031* (2013.01); *G02B 6/0073* (2013.01); *G02B 6/0083* (2013.01); *G02B 6/0085* (2013.01)

(58) Field of Classification Search
CPC .. G02B 6/0018; G02B 6/0023; G02B 6/0031; G02B 6/0073
See application file for complete search history.

(56) References Cited

U.S. PATENT DOCUMENTS

| | | | |
|---|---|---|---|
| 2004/0105251 A1 | 6/2004 | Yu et al. | |
| 2010/0103344 A1* | 4/2010 | Wang | G02B 6/0031 349/61 |
| 2012/0057099 A1* | 3/2012 | Tanuma | G02B 6/0073 349/62 |
| 2012/0106197 A1* | 5/2012 | Lai | B32B 37/12 362/609 |
| 2013/0038211 A1* | 2/2013 | Kang | G02F 1/133603 315/113 |

FOREIGN PATENT DOCUMENTS

| | | |
|---|---|---|
| CN | 101307894 A | 11/2008 |
| CN | 101603660 A | 12/2009 |
| CN | 101887890 A | 11/2010 |
| CN | 202048457 U | 11/2011 |
| CN | 102635810 A | 8/2012 |

* cited by examiner

*Primary Examiner* — Andrew Coughlin
(74) *Attorney, Agent, or Firm* — Andrew C. Cheng

(57) ABSTRACT

The present invention provides a backlight module, which includes: a backplane (2), a light guide plate (4) arranged in the backplane (2), a backlight source (6) arranged in the backplane (2) and located at one side of the light guide plate (4), a light shield (8) arranged between the backlight source (6) and the backplane (2), and a side reflection plate (10) arranged between the light guide plate (4) and the backlight source (6). The backlight source (6) includes an LED substrate (62) and a plurality of LED lights (64) mounted on the LED substrate (62). The side reflection plate (10) has resiliency. The side reflection plate (10) includes a plurality of openings (102) formed therein to correspond to the LED lights (64). The LED lights (64) are receivable in the openings (102) to serve as light sources of the light guide plate (4).

15 Claims, 5 Drawing Sheets

BACKLIGHT MODULE

BACKGROUND OF THE INVENTION

1. Field of the Invention

The present invention relates to the field of flat panel displaying, and in particular to a backlight module.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module for generating images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal display panel.

Referring to FIG. 1, which is a schematic view showing the structure of a conventional backlight module, the backlight module comprises a backplane 20, a plurality of LED substrates 14 arranged in the backplane 20 and comprising LED light sources 24 mounted thereon, a light guide plate 13 arranged in the backplane 20, a reflection plate 17 arranged under the light guide plate 13, a diffusion plate 18 arranged above the light guide plate, an LED driving circuit substrate 15 arranged under the LED substrate 14, and a the light shielding cover 16 arranged in the backplane. The backplane 20 comprises a bottom board 20a and a plurality of side boards 20b connected to the bottom board 20a. The LED substrate 14 comprises a plurality of LED light sources 24 and a tail end section 26. The LED light sources 24 are mounted on a surface of the LED substrate 14 that faces the light guide plate 13. The tail end section 26 is a thin plate and is formed by extending downward from a lower surface of the LED substrate 14. The tail end section 26 comprises an electrically conductive layer connected to corresponding ones of the LED light sources 24. The light guide plate 13 is made of a transparent resin (such as acrylic resin) and comprises a bottom surface 13c facing the bottom board 20a, a top surface 13b distant from the bottom board 20a, and a plurality of side surfaces 13a connected between the bottom surface 13c and the top surface 13b. The LED substrate 14 is arranged parallel to the side surface 13a of the light guide plate 13 and lights emitting from the LED light sources 24 of the LED substrate 14 enters from one of the side surfaces 13a and exits from the top surface 13b that is perpendicular to the side surfaces 13a so as to project the light out. The reflection plate 17 is arranged between the bottom surface 13c of the light guide plate 13 and the bottom board 20a of the backplane 20 to reflect light projecting from the bottom surface 13c back to the light guide plate 13. The diffusion plate 18 is arranged on the top surface 13b of the light guide plate 13 to diffuse and supply the light projecting from the top surface to a liquid crystal panel. Referring to FIG. 2, the LED driving circuit substrate 15 comprises a circuit substrate 28, a driving circuit 29, and receptacles 30. The circuit substrate 28 is an insulation substrate. The circuit substrate 28 has a surface on which the driving circuit 29 that comprises an IC (Integrated Circuit) chip. The circuit substrate 28 has an opposite surface on which a plurality of receptacles 30 is mounted. The driving circuit 29 is arranged parallel to the bottom surface 13c of the light guide plate 13 and positioned against the bottom board 20a of the backplane 20. The driving circuit 29 drives the LED light sources 24 of the LED substrates 14 and is electrically connected to the receptacle 30. The receptacles 30 each comprise therein an insertion hole 31 that is in the form of a thin slit has an inside surface coated with an electrically conductive layer. The tail end section 26 of the respective LED substrate 14 is insertable into the insertion hole 31. Through the tail end section 26 and the insertion hole 31, the LED substrate 14 and driving circuit substrate 15 can be readily combined and separated. The light shielding cover 16 is made of metal and comprises a first light shielding portion 16a and a second light shielding portion 16b, wherein the first light shielding portion 16a is arranged between a side surfaces 13a of the light guide plate 13 and the LED substrate 14 and the second light shielding portion 16b is arranged on the top surface 13b of the light guide plate 13 to block light at the edge of the top surface 13b of the light guide plate 13. The first light shielding portion 16a comprises an opening 16c that is sized corresponding to outside dimensions of the LED light sources 24 to allow light emitting from the LED light sources 24 to pass therethrough and also to retain the LED substrate 14. With a receptacle arranged on driving circuit substrate and a tail end section (functioning like a plug) arranged on the LED substrate, the LED substrate and the driving circuit substrate can be readily combined or separated thereby reducing the steps of assembling the backlight module and achieving simplification of installation and removal of the backlight module.

However, although the LED substrate 14 and the driving circuit substrate 15 are not set to position against the side boards 20b of the backplane 20, in an actual manufacturing process, the LED substrate 14 and the driving circuit substrate 15 are positioned against the side boards 20b of the backplane 20. Since the light shielding cover 16 is made of metal, heat dissipation of the LED substrate 14 is generally done through the light shielding cover 16. However, the light shielding cover 16 is set in tight engagement with the light guide plate 13, the light guide plate 13 is readily heated and gets expanded. Thus, when the LED substrate 14 and the driving circuit substrate 15 are positioned against the side boards 20b of the backplane 20, if the light guide plate 13 is heated and expanded and the light shielding cover 16 does not deform in compliance therewith, the light guide plate 13 would be compressed, leading to ready deformation and cracking.

SUMMARY OF THE INVENTION

An object of the present invention is to provide a backlight module, which effectively prevents deformation or cracking of a light guide plate caused by compression resulting from thermal expansion and also enhances the heat dissipation performance of a product and extends the lifespan of the backlight module.

To achieve the above object, the present invention provides a backlight module, which comprises: a backplane, a light guide plate arranged in the backplane, a backlight source arranged in the backplane and located at one side of the light guide plate, a light shield arranged between the backlight source and the backplane, and a side reflection plate arranged between the light guide plate and the backlight source. The backlight source comprises an LED substrate and a plurality of LED lights mounted on the LED substrate. The side reflection plate has resiliency. The side reflection plate comprises a plurality of openings formed therein to correspond to the LED lights. The LED lights are receivable in the openings to serve as light sources of the light guide plate.

The backplane comprises a bottom board and a plurality of side boards perpendicularly connected to the bottom board.

The light shield is made of a metal material and the LED substrate is positioned against the light shield.

The light shield comprises a first light shielding portion and a second light shielding portion perpendicularly connected to the first light shielding portion. The first light shielding portion is positioned against the side boards of the backplane. The LED substrate is positioned against the first light shielding portion. The second light shielding portion has a free end overlapping the light guide plate.

The backlight source further comprises a circuit board. The LED substrate is mounted to the circuit board. The LED lights are electrically connected to the circuit board.

The circuit board comprises a circuit substrate, a driving circuit formed on the circuit substrate, and a receptacle extending from the circuit substrate.

The receptacle comprises an insertion slot formed therein and the LED substrate comprises a body and an insertion tab extending from the body. The insertion tab is receivable in the insertion slot to mount the LED substrate to the circuit substrate.

The side reflection plate comprises a base plate and a reflective layer formed on the base plate. The openings being of a flaring configuration that increasingly expands from the base plate toward the reflective layer.

The base plate is made of a resilient material and the reflective layer is formed by coating a high reflectivity material on the base plate.

The backlight module further comprises a bottom reflection plate arranged between the light guide plate and the bottom board of the backplane and an optic film assembly arranged on the light guide plate.

The present invention also provides a backlight module, which comprises: a backplane, a light guide plate arranged in the backplane, a backlight source arranged in the backplane and located at one side of the light guide plate, a light shield arranged between the backlight source and the backplane, and a side reflection plate arranged between the light guide plate and the backlight source, the backlight source comprising an LED substrate and a plurality of LED lights mounted on the LED substrate, the side reflection plate having resiliency, the side reflection plate comprising a plurality of openings formed therein to correspond to the LED lights, the LED lights being receivable in the openings to serve as light sources of the light guide plate;

wherein the backplane comprises a bottom board and a plurality of side boards perpendicularly connected to the bottom board;

wherein the light shield is made of a metal material and the LED substrate is positioned against the light shield;

wherein the light shield comprises a first light shielding portion and a second light shielding portion perpendicularly connected to the first light shielding portion, the first light shielding portion being positioned against the side boards of the backplane, the LED substrate being positioned against the first light shielding portion, the second light shielding portion having a free end overlapping the light guide plate;

wherein the backlight source further comprises a circuit board, the LED substrate being mounted to the circuit board, the LED lights being electrically connected to the circuit board; and wherein the circuit board comprises a circuit substrate, a driving circuit formed on the circuit substrate, and a receptacle extending from the circuit substrate.

The receptacle comprises an insertion slot formed therein and the LED substrate comprises a body and an insertion tab extending from the body. The insertion tab is receivable in the insertion slot to mount the LED substrate to the circuit substrate.

The side reflection plate comprises a base plate and a reflective layer formed on the base plate. The openings are of a flaring configuration that increasingly expands from the base plate toward the reflective layer.

The base plate is made of a resilient material and the reflective layer is formed by coating a high reflectivity material on the base plate.

The backlight module further comprises a bottom reflection plate arranged between the light guide plate and the bottom board of the backplane and an optic film assembly arranged on the light guide plate.

The efficacy of the present invention is that the present invention provides a backlight module, which comprises a resilient side reflection plate to effectively buffer deformation of a light guide plate resulting from heating so as to avoid cracking of the light guide plate due to the deformation of the light guide plate resulting from thermal expansion being constrained. Further, a metal light shield is provided to effectively prevent light emitting from a backlight source from leaking through the sites of the edges of the light guide plate and also to enhance the heat dissipation performance of the backlight module to improve the quality of the backlight module.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
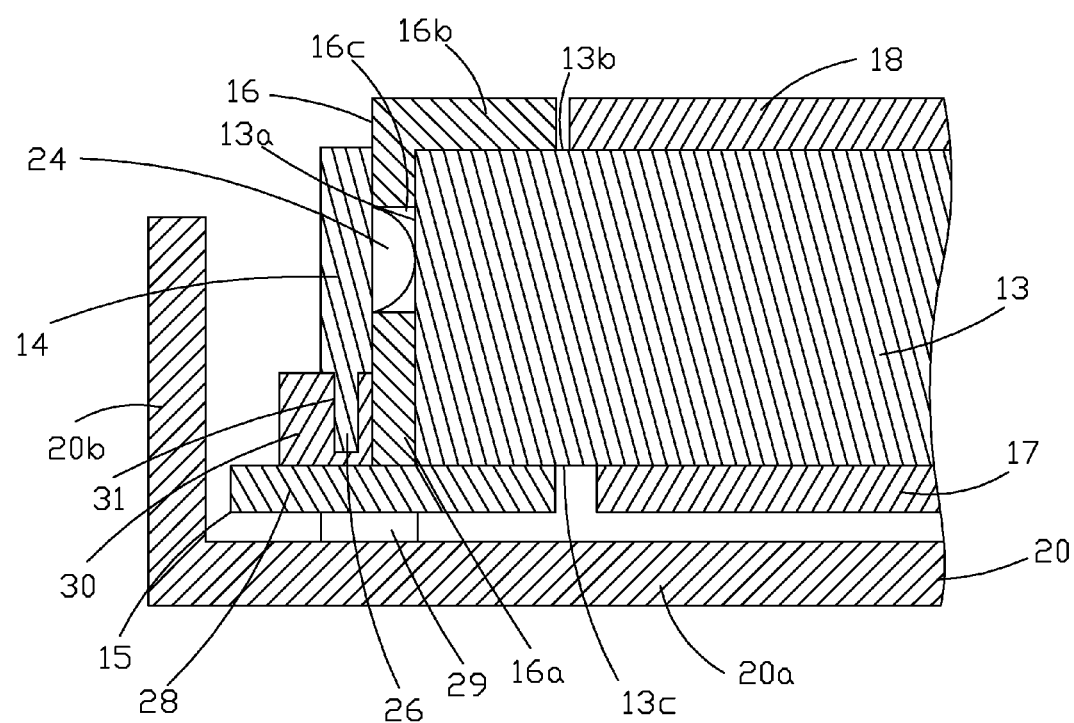
FIG. 1 is a cross-sectional view showing a conventional backlight module.
Figure 2:
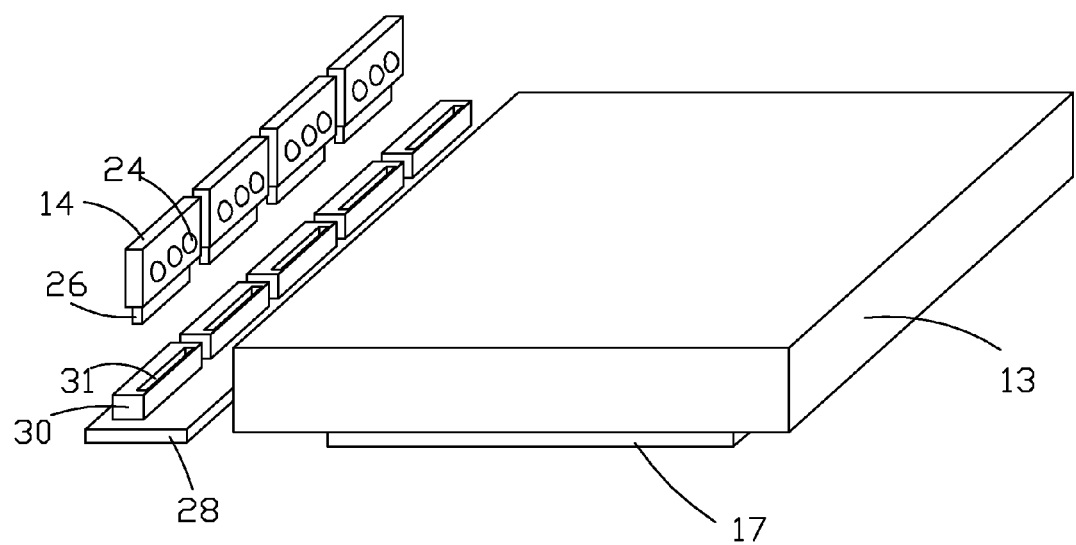
FIG. 2 is an exploded view of an inside structure of the backlight module of FIG. 1.
Figure 3:
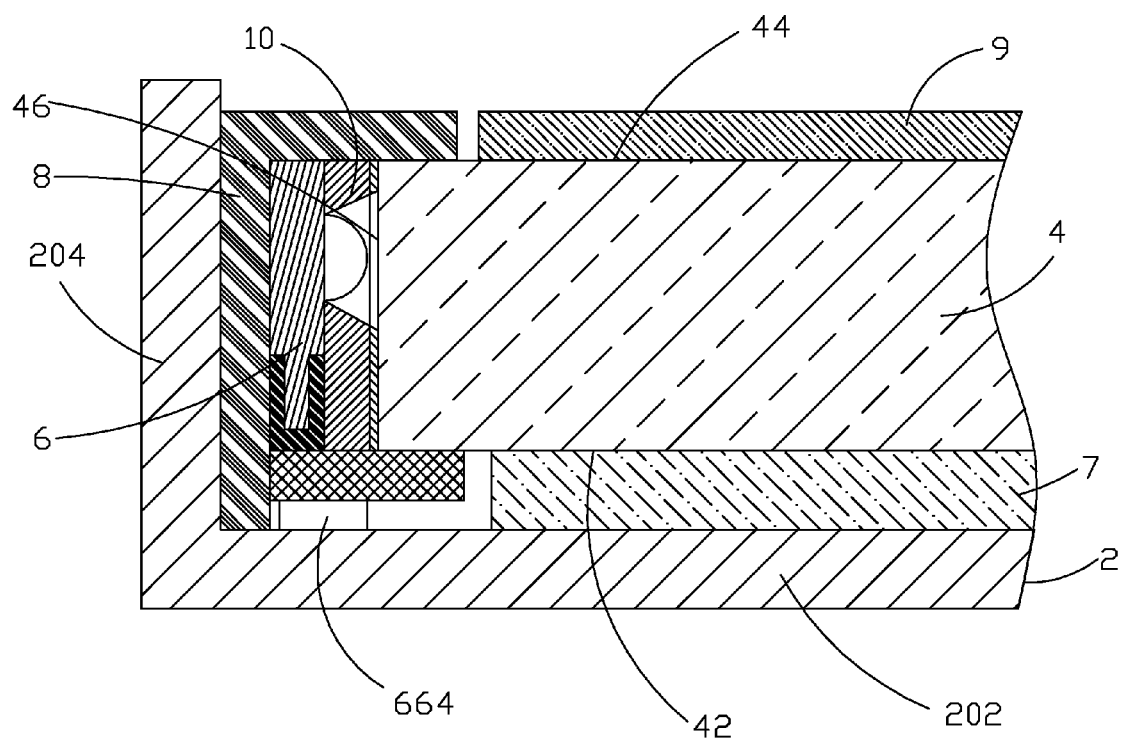
FIG. 3 is a cross-sectional view showing a backlight module according to the present invention.

Referring to FIG. 3, the present invention provides a backlight module, which comprises: a backplane 2, a light guide plate 4 arranged in the backplane 2, a backlight source 6 arranged in the backplane 2 and located at one side of the light guide plate 4, a light shield 8 arranged between the backlight source 6 and the backplane 2, and a side reflection plate 10 arranged between the light guide plate 4 and the backlight source 6. The backlight source 6 emits light that is directly reflected by the side reflection plate 10 to get into the light guide plate 4 and propagates in the light guide plate 4 to convert a spot light source into a planar light source.

Specifically, the backplane 2 comprises a bottom board 202 and a plurality of side boards 204 perpendicularly connected to the bottom board 202. The bottom board 202 and a plurality of side boards 204 collectively define a receiving space. The light guide plate 4, the backlight source 6, the light shield 8, and the side reflection plate 10 are all received in the receiving space.

The light guide plate 4 comprises a bottom surface 42 facing the bottom board 202 of the backplane 2, a top surface 44 arranged opposite to the bottom surface 42, and a plurality of side surfaces 46 connecting between the bottom surface 42 and the top surface 44. In the instant embodiment, the top surface 44 is the light exit surface of the light guide plate 4. At least one of the plurality of side surfaces 46 is a light incidence surface of the light guide plate 4. The backlight source 6 is arranged at a side of the light incidence surface of the light guide plate 4.

Figure 4:
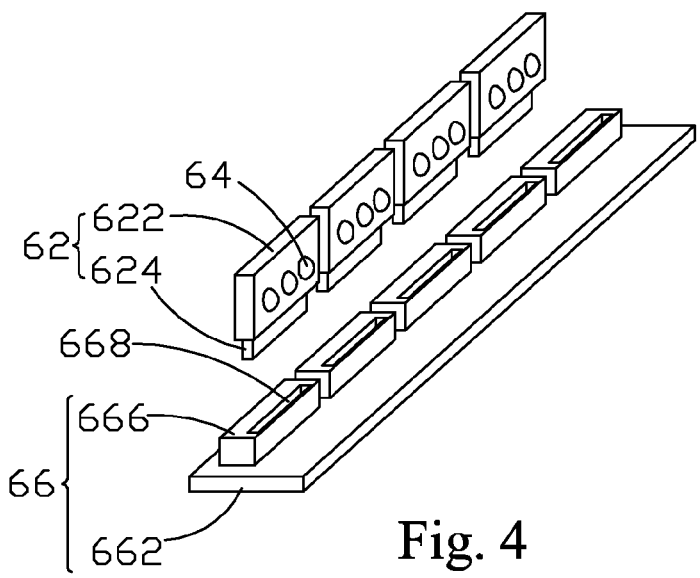
FIG. 4 is an exploded view showing a backlight source of FIG. 3.

Referring to FIG. 4, the backlight source 6 comprises an LED (Light-Emitting Diode) substrate 62, a plurality of LED lights 64 mounted on the LED substrate 62, and a circuit board 66. The LED substrate 62 is mounted to the circuit board 66 and the LED lights 64 are electrically connected to the circuit board 66. Further, the circuit board 66 comprises a circuit substrate 662, a driving circuit 664 formed on the circuit substrate 662, and a receptacle 666 that is formed by extending from the circuit substrate 662. The receptacle 666 comprises an insertion slot 668 formed therein. The LED substrate 62 comprises a body 622 and an insertion tab 624 extending from the body 622. The insertion tab 624 is receivable in the insertion slot 668 in order to mount the LED substrate 62 to the circuit substrate 662. Specifically, the insertion slot 668 comprises a first electrical conduction layer (not shown) formed therein and the driving circuit 664 is electrically connected to the first electrical conduction layer; the insertion tab 624 has an outside surface on which a second electrical conduction layer (not shown) is similarly provided and the LED lights 64 are electrically connected to the second electrical conduction layer, whereby when the insertion tab 624 is inserted into the insertion slot 668, the first and second electrical conduction layers electrically engage each other to electrically connect the driving circuit 664 and the LED lights 64 to each other so as to realize driving and lighting of the LED lights 64 by the driving circuit 664.

Multiple sets of the LED lights 64 can achieve electrical connection with the driving circuit 664 through insertion so that when one of the LED lights 64 malfunctions, making it require maintenance or replacement, it only needs to pull the LED substrate 62 associated with the LED light 64 out of the receptacle 666. The operation is easy and the maintenance cost is effectively reduced.

Figure 5:
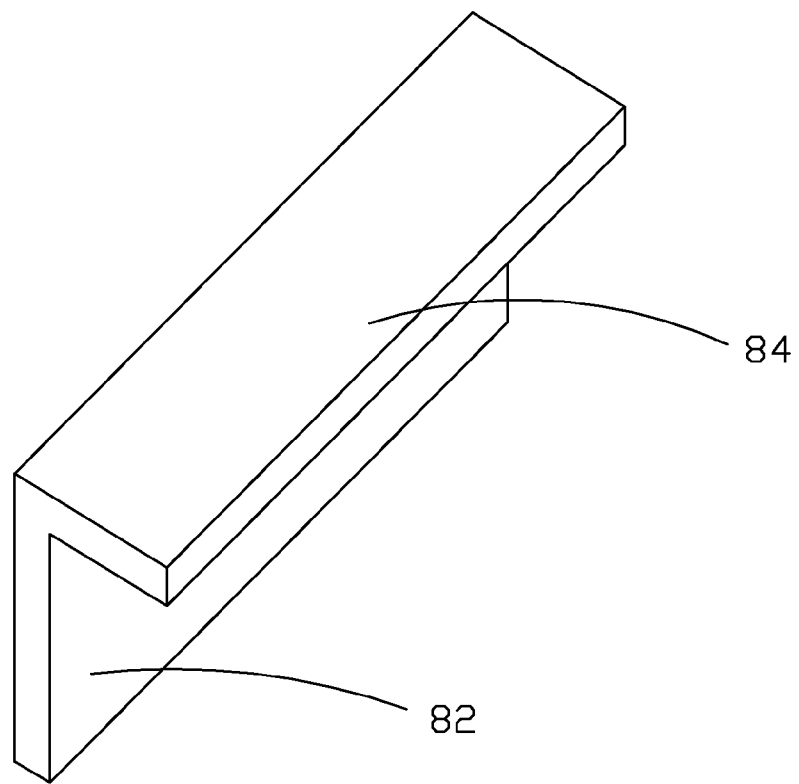
FIG. 5 is a perspective view showing a light shield of FIG. 3.

Referring to FIG. 5, the light shield 8 is made of a metal material and comprises a first light shielding portion 82 and a second light shielding portion 84 perpendicularly connected to the first light shielding portion 82. The first light shielding portion 82 is positioned against the side boards 204 of the backplane 2 and the second light shielding portion 84 has a free end overlapping the light guide plate 4. Specifically, the first light shielding portion 82 of the light shield 8 is positioned on the side boards 204 of the backplane 2 and the LED substrate 62 of the backlight source 6 is positioned against the first light shielding portion 82; the second light shielding portion 84 is set overlapping the top surface 44 of the light guide plate 4, namely the second light shielding portion 84 overlaps the light exit surface of the light guide plate 4 in order to prevent light from leaking through that site to affect the quality of the backlight module.

Further, since the light shield 8 is made of a metal material, heat generated by emission of light by the LED lights 64 of the backlight source 6 is transmitted through the LED substrate 62 to the light shield 8 and then transmitted through the light shield 8 to the side boards 204 of the backplane 2, and finally transmitted through the side boards 204 to execute heat exchange with the surroundings, thereby effectively enhancing the heat dissipation performance of the backlight module and thus improving the quality of the backlight module.

Figure 6:
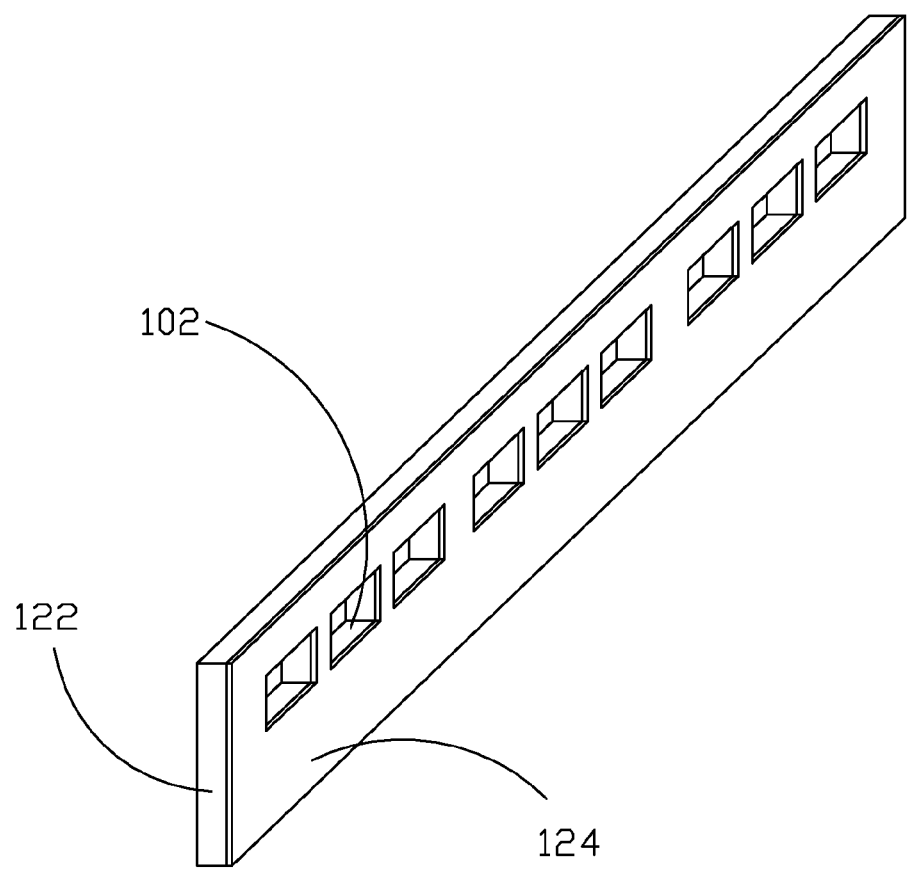
FIG. 6 is a perspective view showing a side reflection plate of FIG. 3.

Referring to FIG. 6, the side reflection plate 10 is resilient and in the instant embodiment, the side reflection plate 10 comprises a base plate 122 and a reflective layer 124 formed on the base plate 122. The side reflection plate 10 comprises a plurality of openings 102 formed therein to correspond to the LED lights 64 so that the LED lights 64 are receivable in the openings 102 to serve as light sources of the light guide plate 4. Preferably, the openings 102 are of a flaring configuration by increasingly expanding from the base plate 122 toward the reflective layer 124 so as to provide light to the light guide plate 4 in a diverging manner to improve utilization of the backlight source 6 and also help improve homogeneity of illumination.

Specifically, the base plate 122 is made of a resilient material and the reflective layer 124 is formed by coating a high reflectivity material on the base plate 122. The reflective layer 124 of the side reflection plate 10 is set in engagement with the light incidence surface of the light guide plate 4 and the LED lights 64 projects lights through the openings 102 towards the light guide plate 4. The light guide plate 4 absorbs the heat emitting from the LED lights 64 and is caused to expansion and deformation. The base plate 122 buffers the expansion and deformation and maintaining the engagement with the light incidence surface of the light guide plate 4, so as to prevent the light guide plate 4 from being compressed by an external force to get cracking and also to effectively extend the lifespan of the backlight module, while ensuring a desired effect of reflection.

Referring to FIG. 3, it is noted that the backlight module may further comprise a bottom reflection plate 7 arranged between the light guide plate 4 and the bottom board 202 of the backplane 2 and an optic film assembly 9 arranged on the light guide plate 4. The bottom reflection plate 7 reflects light projecting from the bottom surface 42 of the light guide plate back to the light guide plate 4 to maintain intensity of illumination of the backlight module. The optic film assembly 9 helps further increase the intensity of illumination of the backlight module.

In summary, the present invention provides a backlight module, which comprises a resilient side reflection plate to effectively buffer deformation of a light guide plate resulting from heating so as to avoid cracking of the light guide plate due to the deformation of the light guide plate resulting from thermal expansion being constrained. Further, a metal light shield is provided to effectively prevent light emitting from a backlight source from leaking through the sites of the edges of the light guide plate and also to enhance the heat dissipation performance of the backlight module to improve the quality of the backlight module.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A backlight module, comprising: a backplane, a light guide plate arranged in the backplane, a backlight source arranged in the backplane and located at one side of the light guide plate, a light shield arranged between the backlight source and the backplane, and a side reflection plate arranged between the light guide plate and the backlight source, the backlight source comprising an LED (Light-Emitting Diode) substrate and a plurality of LED lights mounted on the LED substrate, the side reflection plate having resiliency, the side reflection plate comprising a plurality of openings formed therein to correspond to the LED lights, the LED lights being receivable in the openings to serve as light sources of the light guide plate, wherein the side reflection plate has a surface in engagement with the light guide plate and an opposite surface in engagement with the LED substrate of the backlight source so as to be interposed between the light guide plate and LED substrate to provide cushioning between the light guide plate and the LED substrate for absorbing deformation of the light guide plate.

2. The backlight module as claimed in claim 1, wherein the backplane comprises a bottom board and a plurality of side boards perpendicularly connected to the bottom board.

3. The backlight module as claimed in claim 2 further comprising a bottom reflection plate arranged between the light guide plate and the bottom board of the backplane and an optic film assembly arranged on the light guide plate.

4. The backlight module as claimed in claim 1, wherein the light shield is made of a metal material and the LED substrate is positioned against the light shield.

5. The backlight module as claimed in claim 4, wherein the light shield comprises a first light shielding portion and a second light shielding portion perpendicularly connected to the first light shielding portion, the first light shielding portion being positioned against the side boards of the backplane, the LED substrate being positioned against the first light shielding portion, the second light shielding portion having a free end overlapping the light guide plate.

6. The backlight module as claimed in claim 5, wherein the backlight source further comprises a circuit board, the LED substrate being mounted to the circuit board, the LED lights being electrically connected to the circuit board.

7. The backlight module as claimed in claim 6, wherein the circuit board comprises a circuit substrate, a driving circuit formed on the circuit substrate, and a receptacle extending from the circuit substrate.

8. The backlight module as claimed in claim 7, wherein the receptacle comprises an insertion slot formed therein and the LED substrate comprises a body and an insertion tab extending from the body, the insertion tab being receivable in the insertion slot to mount the LED substrate to the circuit substrate.

9. The backlight module as claimed in claim 1, wherein the side reflection plate comprises a base plate and a reflective layer formed on the base plate, the openings being of a flaring configuration that increasingly expands from the base plate toward the reflective layer.

10. The backlight module as claimed in claim 9, wherein the base plate is made of a resilient material and the reflective layer is formed by coating a high reflectivity material on the base plate.

11. A backlight module, comprising: a backplane, a light guide plate arranged in the backplane, a backlight source arranged in the backplane and located at one side of the light guide plate, a light shield arranged between the backlight source and the backplane, and a side reflection plate arranged between the light guide plate and the backlight source, the backlight source comprising an LED (Light-Emitting Diode) substrate and a plurality of LED lights mounted on the LED substrate, the side reflection plate having resiliency, the side reflection plate comprising a plurality of openings formed therein to correspond to the LED lights, the LED lights being receivable in the openings to serve as light sources of the light guide plate, wherein the side reflection plate has a surface in engagement with the light guide plate and an opposite surface in engagement with the LED substrate of the backlight source so as to be interposed between the light guide plate and LED substrate to provide cushioning between the light guide plate and the LED substrate for absorbing deformation of the light guide plate;

wherein the backplane comprises a bottom board and a plurality of side boards perpendicularly connected to the bottom board;

wherein the light shield is made of a metal material and the LED substrate is positioned against the light shield;

wherein the light shield comprises a first light shielding portion and a second light shielding portion perpendicularly connected to the first light shielding portion, the first light shielding portion being positioned against the side boards of the backplane, the LED substrate being positioned against the first light shielding portion, the second light shielding portion having a free end overlapping the light guide plate;

wherein the backlight source further comprises a circuit board, the LED substrate being mounted to the circuit board, the LED lights being electrically connected to the circuit board; and wherein the circuit board comprises a circuit substrate, a driving circuit formed on the circuit substrate, and a receptacle extending from the circuit substrate.

12. The backlight module as claimed in claim 11, wherein the receptacle comprises an insertion slot formed therein and the LED substrate comprises a body and an insertion tab extending from the body, the insertion tab being receivable in the insertion slot to mount the LED substrate to the circuit substrate.

13. The backlight module as claimed in claim 11, wherein the side reflection plate comprises a base plate and a reflective layer formed on the base plate, the openings being of a flaring configuration that increasingly expands from the base plate toward the reflective layer.

14. The backlight module as claimed in claim 13, wherein the base plate is made of a resilient material and the reflective layer is formed by coating a high reflectivity material on the base plate.

15. The backlight module as claimed in claim 11 further comprising a bottom reflection plate arranged between the light guide plate and the bottom board of the backplane and an optic film assembly arranged on the light guide plate.

* * * * *